H. L. DOHERTY.
METHOD OF OPERATING GAS PRODUCERS.
APPLICATION FILED JAN. 17, 1911.
1,069,866.
Patented Aug. 12, 1913.
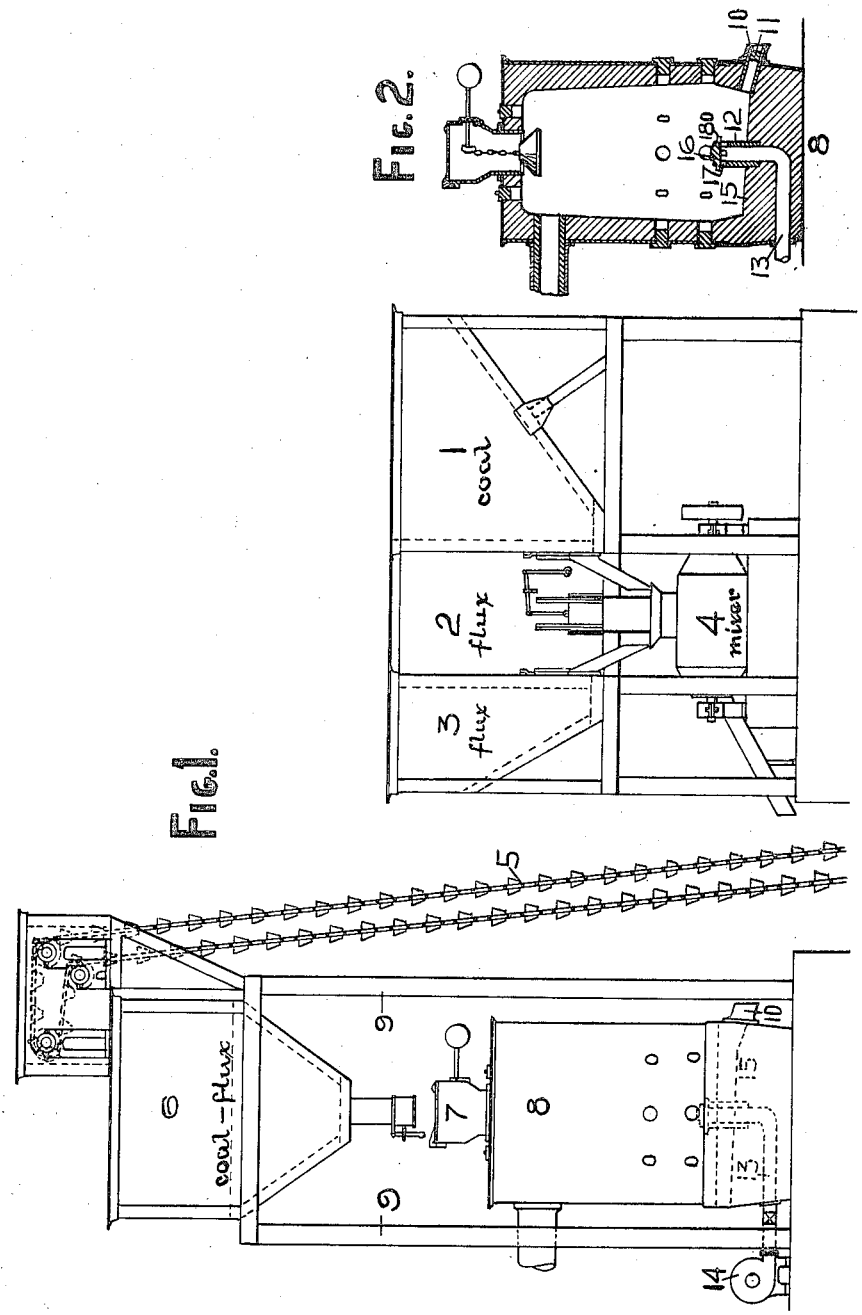
Henry L. Doherty, Inventor
By his Attorney Frank S. Young.
Witnesses:

UNITED STATES PATENT OFFICE.

HENRY L. DOHERTY, OF NEW YORK, N. Y.

METHOD OF OPERATING GAS-PRODUCERS.

1,069,866.   Specification of Letters Patent.   Patented Aug. 12, 1913.

Application filed January 17, 1911.   Serial No. 603,082.

*To all whom it may concern:*

Be it known that I, HENRY L. DOHERTY, a citizen of the United States, and a resident of New York city, in the county of New York and State of New York, have invented certain new and useful Improvements in Methods of Operating Gas-Producers, of which the following is a specification.

This invention relates to a method of operating gas producers and, in particular, to a method of operation in which a suitable flux is charged into the producer with the fuel and the producer operated at a high temperature.

The object of my invention is to avoid the formation of clinkers in the operation of gas producers by insuring that the ash shall be fluxed as rapidly as it is formed so that there is no danger of the sintering of the ash, due to incipient fusion, into large masses of clinker that will obstruct the draft through the fuel bed.

My invention consists in mixing with the fuel the proper quantity of lime, alkali, iron oxid, silica or other flux, or such a mixture of two or more of these substances as will form an easily fusible silicate with the ash of the fuel and subjecting the mixture to combustion in the gas producer. The ash is thus fluxed as fast as it is liberated by the combustion of the carbon of the fuel, runs down through the interstices of the charge, and collects in the bottom of the gas producer from whence it is tapped off, at intervals.

In specifying an easily fusible silicate I mean a silicate which liquefies sufficiently to flow readily at the maximum temperatures ordinarily used in gas producers, e. g., temperatures between 2400° and 2600° F. I am aware that in metallurgical operations it is customary to flux off the silicious matter of the ore and fuel by the addition of a fluxing material such as limestone; but such operations invariably require a high temperature for maintaining the reactions involved and silicates fusible at such temperatures are readily produced.

My invention involves the production of compounds that are liquid at the comparatively low temperatures used in gas producers such as are mentioned above. To produce compounds fusible at these temperatures with the ash of fuels requires the formation of compounds having compositions very different from those of metallurgical furnace slags.

In the drawings, Figure 1 is a diagrammatic view of an arrangement of apparatus suitable for applying my invention, and Fig. 2 is a vertical longitudinal section of the gas producer shown in Fig. 1.

1, is a coal-pocket into which the coal is transferred from the cars in which it is transported.

2 and 3 are similar pockets in which the flux to be used in making up the charge is stored.

4 is a mixing apparatus in which the flux and coal are thoroughly mixed.

5 is an elevator which raises the prepared fuel to the feed bin, 6, supported above the feed hopper, 7, of the gas producer, 8, by the columns, 9.

The gas producer, 8, is simply a low shaft with thick walls of refractory material and an inclined bottom. A cinder notch, 10, closed by a plug, 11, of fire clay, permits of the tapping off of the fluid silicate formed from the ash proper and the flux intentionally added to the charge. A twyer, 12, connected to the pipe 13 from blower 14 permits of the air blast supplied to the gas producer being introduced well above any molten ash which may have collected in the hearth 15 of producer 8. A hood, 16, having a number of discharge ports, 17, prevents the entrance of fuel or slag into the twyer 12 and, owing to its projecting edge, 18, keeps an open space in the fuel bed immediately in front of the ports 17. Since I am able by my invention to operate the gas producer at a relatively high temperature as compared with ordinary producer practice (say around 2400° F.) without causing the formation of any serious amount of clinkers, I am not under the necessity of using steam or flue gas to reduce the temperature in the producer, in the manner customary in producer operation. Therefore I supply a straight air draft-current to the producer.

The material which I use as flux and the quantity thereof which I add to the fuel depends entirely upon the composition and quantity of the ash of the fuel. In some localities where crude sulfate of soda is available, this material may advantageously be used as the flux when the ash of the fuel is unduly acid. Usually, however, the most economical and available material is either iron ore or limestone. In nearly all parts of the country deposits of impure hematite or limonite occur in greater or less quantity. Since both the ferric and ferrous silicates, containing a relatively high proportion of base, are usually quite fusible (e. g. almandite and fayalite) such ores as hematite and limonite furnish an easily procurable and satisfactory basic flux. Since this is, usually, what is required, in the majority of cases it will not be necessary to add any other material to the fuel to supply the ingredients for the formation of an easily fusible silicate.

In the majority of cases, the infusibility of ash is caused by the presence of an excessive proportion of alumina or silica, or both. While in some combinations with iron and the alkali metals aluminium forms easily fusible silicates, all of the simple silicates of aluminium are either infusible or fusible with difficulty. Generally, therefore, the fusibility of a silcate diminishes with increase in the proportion of alumina. Therefore, where the proportion of alumina is unduly high, I add the proper proportion of iron or iron and silica to form some easily fusible double silicate of iron and alumina which may have a composition, for instance, approximating that of the mineral almandite, $Fe_3Al_2Si_3O_{12}$, which fuses at about 2100° F. When the alumina is low and the infusibility of the ash is due simply to an excessive proportion of silica, iron oxid alone will usually furnish the ingredients for the formation of a suitable silicate. It is usually cheaper, however, to add an ordinary iron ore containing a considerable proportion of gangue than to prepare a pure oxid of iron by some form of concentration.

Of the fluxes available for my process limestone or lime is probably the cheapest and most generally obtainable. The most serious objection to the use of limestone is the fact that it must be rather finely crushed to insure its decomposition to CaO and $CO_2$ during the period in which it is passing through the gas producer. It is practically necessary, under the conditions which must be met, that the limestone should reach the ash zone of the gas producer thoroughly calcined. It is also important that the calcined stone or lime should reach the ash zone in a fairly fine condition to facilitate its reacting with the ash particles. If burned limestone is used to mix with the fuel it can, of course, be readily reduced to the powdered condition by hydrating it, using care to restrict the water to just about the quantity theoretically required—allowing for the portion of the water which is evaporated by the heat of the reaction and lost as steam.

When lime, or limestone is used as the flux there is usually no difficulty in obtaining it fairly pure. The increase in the bulk of the mineral matter in the fuel, which is a necessary consequence of my invention, is, in no sense, objectionable by my method of operating a gas producer on the prepared fuel which is the subject of this application, since the ash may be tapped out as frequently as is necessary, without occasioning any interruption of the operation of the producer.

It is obvious that the exact proportion of flux added to the fuel will depend upon the composition of the ash of the fuel and upon the kind and purity of the flux itself. The ash of a Buck Mountain anthracite will have approximately the following composition, viz.:

$SiO_2$---------------- 45.60%
$Al_2O_3$-------------- 42.75%
$Fe_2O_3$-------------- 9.43%
CaO------------------ 1.41%
MgO------------------ .33%
Other ingredients---- .48%

The proportion of ash in the coal would be about 9%. In a ton of coal there would, therefore, be the following weights of ash-forming ingredients, viz.:

$SiO_2$ = 82.1 lb.
$Al_2O_3$ = 76.9 "
$Fe_2O_3$ = 17.0 "
CaO = 2.5 "
MgO = .6 "

Estimating the MgO in its equivalent of lime we can take the lime as 3.3 lb. For forming a silicate of easy fusibility the lime should be, at least, equal in weight to the alumina, if lime is to be the flux used. Therefore the quantity of lime added should be about 76.9 minus 3.3 = 73.6 lb. In this case, owing to the abnormally high alumina, there is a deficiency in the proportion of $SiO_2$ also. Therefore, with the lime, I add the proper quantity of silica, as sand, to bring the proportion of silica in the ash mixture up to a weight about equal to the sum of the weights of alumina and lime. Since there are 82.1 lb. of silica, already present in the ash, the quantity of sand required would be about (76.9+76.9) — 82.1 = 71.7 lb.

It is, of course, to be understood that I do not limit myself to operating the producer with the proportions of flux given above. It is simply necessary that the quantities and kinds of flux be so adjusted that a compound of ash and flux be formed which will be fusible at the temperature of the fuel bed of the producer. The mineral matter in the ash is thus reduced to a liquid condition as fast as it is formed, with the result that it flows to the hearth of the gas producer, from which it is tapped out at intervals.

Having described my invention, what I claim is:—

1. The method of operating gas producers which comprises charging into a gas producer a mixture of fuel and flux such that the mineral matter of the charge will form an easily fusible compound, the said flux comprising a proportion of basic material other than alumina which will establish in the charge a proportion of such bases which shall be at least equal to the alumina free or combined present in the mixture of fuel and flux, burning said fuel in said producer by introducing into the ignited fuel an oxidizing draft current to form combustible gas and liquid ash, and withdrawing from said producer the said gas and liquid ash.

2. The method of operating gas producers which comprises charging into a gas producer a mixture of fuel and flux such that the mineral matter of the charge will form an easily fusible compound, the said flux comprising a proportion of basic material other than alumina which shall establish in the charge a proportion of such bases at least equal to the alumina free or combined that is present in the charge, burning said fuel by introducing into the ignited fuel a draft current of air, to form combustible gas and liquid ash, and withdrawing the said gas and liquid ash from said producer.

3. The method of operating gas producers which comprises charging into a gas producer a mixture of fuel and flux such that the mineral matter of the charge will form an easily fusible compound, the said flux comprising a proportion of basic material other than alumina which shall establish a proportion of such bases in the charge at least equal to the alumina free or combined that is present in the charge and if necessary a quantity of silica such that the total silica present in the charge will be sufficient to form with the basic material of the charge a silicate fusing below 2600° F., burning combustible matter of the charge by introducing into the ignited fuel an oxidizing draft current to form combustible gas and liquid ash, and withdrawing from the producer the gas and ash formed.

4. The method of operating gas producers which comprises charging into a gas producer a mixture of fuel and flux such that the mineral matter of the charge will form an easily fusible compound, the said flux comprising a proportion of basic material other than alumina which shall establish a proportion of such bases in the charge at least equal to the alumina free or combined that is present in the charge and if necessary a quantity of silica such that the total silica present in the charge will be sufficient to form with the basic material of the charge a silica fusing below 2600° F., burning combustible matter of the charge by introducing into the ignited fuel a draft current of air to form combustible gas and liquid ash, and withdrawing from the producer the gas and ash formed.

5. The method of operating gas producers which comprises charging into a gas producer a mixture of fuel and flux such that the mineral matter of the charge will form an easily fusible compound, the said flux comprising a proportion of basic material other than alumina which shall establish a proportion of such bases in the charge at least equal to the alumina free or combined that is present in the charge, and if necessary a quantity of silica such as will establish a proportion of silica in the charge approximating the proportion of total bases in the charge, burning combustible matter of the charge by introducing into the ignited fuel an oxidizing draft current to form combustible gas and liquid ash, and withdrawing from the producer the gas and ash formed.

6. The method of operating gas producers which comprises charging into a gas producer a mixture of fuel and flux such that the mineral matter of the charge will form an easily fusible compound, the said flux comprising a proportion of iron oxid such as will establish a proportion of iron oxid whose basicity together with that of the alkali or alkaline earth bases present in the charge shall be at least equal to the alumina free and combined present in the charge, burning combustible matter of the charge by introducing into the ignited fuel an oxidizing draft current to form combustible gas and liquid ash, and withdrawing from the producer the gas and ash formed.

7. The method of operating gas producers which comprises charging into a gas producer a mixture of fuel and flux, the relative proportions of said fuel and flux being such as will establish in the charge a proportion of iron oxid whose basicity together with that of the alkali or alkaline earth bases present in the charge shall be at least equal to the alumina free and combined present in the charge and a proportion of silica at least equal to that of the basic materials of the charge, burning combustible matter of the charge by introducing into the ignited charge an oxidizing draft current to form combustible gas and liquid ash, and withdrawing from said producer the gas and ash formed.

8. The method of operating gas producers which comprises charging into a gas producer a mixture of fuel and flux, the relative proportions of said fuel and flux being such as will establish in the charge a proportion of bases other than alumina at least equal to the alumina free or combined present in the charge, burning combustible matter of the charge by introducing into the ignited fuel an oxidizing draft current to form combustible gas and ash, and withdrawing from said gas producer the gas and ash formed.

9. The method of operating gas producers which comprises charging into a gas producer a mixture of fuel and flux, the relative proportions of said fuel and flux and the character of the said flux being such as will establish in the charge a proportion of bases other than alumina at least equal to the alumina free or combined present in the charge and a proportion of silica free or combined at least equal to the total bases of the charge, burning combustible matter of the charge by introducing into the ignited fuel an oxidizing current to form combustible gas and ash, and withdrawing from the producer the gas and ash formed.

Signed at New York city in the county of New York and State of New York this 16th day of January A. D. 1911.

HENRY L. DOHERTY.

Witnesses:
J. M. McMILLIN,
F. L. BLACKBURN.